United States Patent
Shih et al.

(10) Patent No.: US 11,228,818 B2
(45) Date of Patent: Jan. 18, 2022

(54) TELECOMMUNICATIONS PANEL WITH PATCHING DEVICE INSTALLATION FEATURES

(71) Applicant: COMMSCOPE TECHNOLOGIES LLC, Hickory, NC (US)

(72) Inventors: Yi Teh Shih, Richardson, TX (US); Brian J. Fitzpatrick, McKinney, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/762,806

(22) PCT Filed: Nov. 8, 2018

(86) PCT No.: PCT/US2018/059775
§ 371 (c)(1),
(2) Date: May 8, 2020

(87) PCT Pub. No.: WO2019/094558
PCT Pub. Date: May 16, 2019

(65) Prior Publication Data
US 2021/0185417 A1     Jun. 17, 2021

Related U.S. Application Data

(60) Provisional application No. 62/584,524, filed on Nov. 10, 2017.

(51) Int. Cl.
*H04Q 1/02* (2006.01)
*H01R 13/74* (2006.01)
*H01R 25/00* (2006.01)

(52) U.S. Cl.
CPC ............ *H04Q 1/13* (2013.01); *H01R 13/743* (2013.01); *H01R 25/006* (2013.01)

(58) Field of Classification Search
CPC ....... H04Q 1/13; H01R 25/006; H01R 13/743
See application file for complete search history.

(56) References Cited

U.S. PATENT DOCUMENTS

| 6,086,415 A | 7/2000 | Sanchez et al. |
| 8,480,429 B2 * | 7/2013 | Byrne ................... H02G 3/128 439/574 |

(Continued)

FOREIGN PATENT DOCUMENTS

| CN | 101443967 A | 5/2009 |
| CN | 105359549 A | 2/2016 |

(Continued)

OTHER PUBLICATIONS

International Search Report and Written Opinion of the International Searching Authority for International Patent Application No. PCT/US2018/059775 dated Mar. 4, 2019, 10 pages.

(Continued)

*Primary Examiner* — Jean F Duverne
(74) *Attorney, Agent, or Firm* — Merchant & Gould P.C.

(57) ABSTRACT

A telecommunications panel has various features for removably mounting patching devices to the panel. The telecommunications panel includes mounting flanges and ramp elements for facilitating mounting and removal of patching devices. The ramp element is associated with a receptacle opening of the panel and configured to contact a flexible latch of the patching device and depress the flexible latch as the patching device is received in the receptacle opening.

20 Claims, 12 Drawing Sheets

(56) References Cited

U.S. PATENT DOCUMENTS

| | | | |
|---|---|---|---|
| 8,758,048 B2* | 6/2014 | Nesme | H01R 43/01 |
| | | | 439/540.1 |
| 10,310,206 B2* | 6/2019 | Takeuchi | H04Q 1/025 |
| 2002/0119681 A1 | 8/2002 | Follingstad et al. | |
| 2005/0124210 A1 | 6/2005 | Zhang et al. | |
| 2009/0004913 A1 | 1/2009 | Caveney et al. | |
| 2009/0034226 A1 | 2/2009 | Herndon et al. | |
| 2010/0255716 A1 | 10/2010 | Frey et al. | |
| 2016/0248197 A1 | 8/2016 | Fransen et al. | |
| 2017/0229825 A1 | 8/2017 | Baines et al. | |

FOREIGN PATENT DOCUMENTS

| | | |
|---|---|---|
| CN | 105745631 A | 7/2016 |
| CN | 106058573 A | 10/2016 |
| EP | 2 993 912 A2 | 3/2016 |
| WO | 2007/106491 A1 | 9/2007 |

OTHER PUBLICATIONS

Product Specifications: 1-1479191-3, SL Series Speaker Post Insert, red stripe, alpine white, CommScope, Inc., 1 page (Sep. 6, 2017).

Chinese Office Action for Application No. 201880072604.3 dated Jul. 29, 2021 (with English Translation).

Connector Meeting High Mechanical and Environmental Requirements of the Automotive Industry, Electronics Products, Issue 08, p. 67 (Aug. 2012).

Extended European Search Report for Application No. 18877120.8 dated Jul. 20, 2021.

Merriam et al., "A Three-Dimensional 64-Site Folded Electrode Array Using Planar Fabrication," Journal of Microelectromechanical Systems, vol. 20, No. 3, pp. 594-600 (Jun. 2011).

* cited by examiner

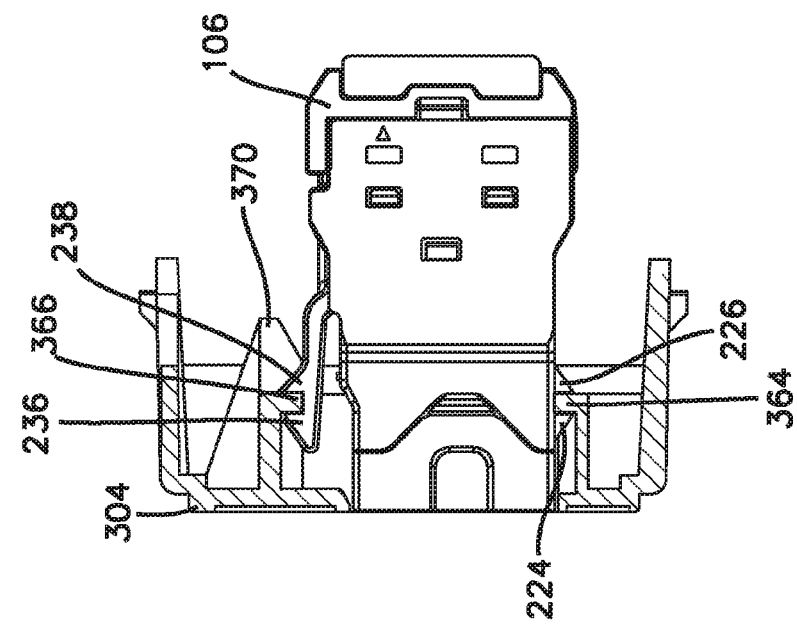
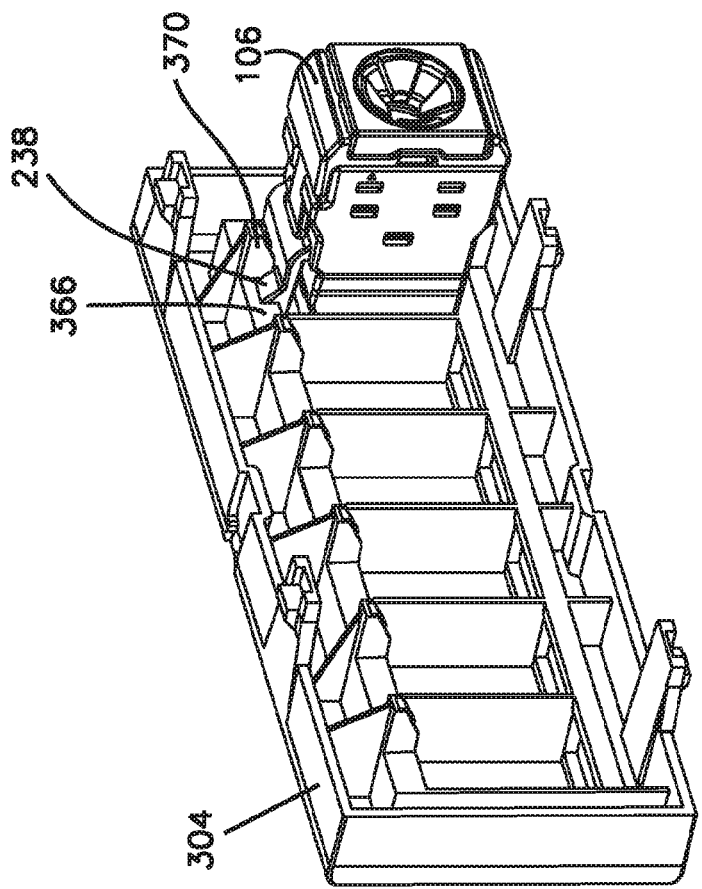
FIG. 11

TELECOMMUNICATIONS PANEL WITH PATCHING DEVICE INSTALLATION FEATURES

CROSS-REFERENCE TO RELATED APPLICATION

This application is a National Stage Application of PCT/US2018/059775, filed on Nov. 8, 2018, which claims the benefit of U.S. Patent Application Ser. No. 62/584,524, filed on Nov. 10, 2017, the disclosures of which are incorporated herein by reference in their entireties. To the extent appropriate, a claim of priority is made to each of the above disclosed applications.

BACKGROUND

Patching equipment is used for connection between telecommunications apparatuses. Patching equipment typically includes one or more patch panels which are mounted to a distribution frame rack so as to generally define a patching side, where patch cords from another active device or another patch panel can be cross-connected or interconnected, and a distribution side, where cables from network equipment and/or work station areas are terminated.

Various patching devices are used in patching equipment. For example, patch panels can mount a number of electrical components, such as electrical connectors, jacks, and other inserts, in a dense configuration. Such multiple patching devices need to be conveniently installed and uninstalled in patch panels for effective and cost-efficient management.

SUMMARY

In general terms, the present disclosure relates to a telecommunications panel having various features for removably mounting patching devices thereto. In one possible configuration and by non-limiting example, the telecommunications panel includes mounting flanges and ramp elements for facilitating mounting and removal of patching devices. Various aspects are described in this disclosure, which include, but are not limited to, the following aspects.

One aspect is a telecommunication panel for mounting a patching device. The telecommunication panel includes a panel frame and a receptacle module. The panel frame includes a receptacle module opening. The receptacle module is at least partially received in the receptacle module opening and has a plurality of device receptacle openings each configured to at least partially receive the patching device. The receptacle module includes a first mounting flange, a second mounting flange, and a plurality of ramp elements. The first mounting flange is configured to engage a first slot of the patching device. The first slot is arranged at a first side of the patching device. The second mounting flange is configured to engage a second slot of the patching device. The second slot is arranged at a second side of the patching device. The second side is opposite to the first side of the patching device. The plurality of ramp elements is associated with the plurality of device receptacle openings, respectively. Each of the plurality of ramp elements extends over the second mounting flange and is configured to contact a flexible latch of the patching device and depress the flexible latch as the patching device is received in one of the plurality of device receptacle openings. Each of the plurality of ramp elements is received in a gap of the patching device when the patching device is secured to the receptacle module.

In certain examples, each of the plurality of ramp elements includes a sloped engaging face configured to guide the flexible latch of the patching device. In certain examples, the first mounting flange is arranged to be parallel with the second mounting flange. In certain examples, the plurality of device receptacle openings is arranged in a row along a first direction, and the first mounting flange and the second mounting flange extend in the first direction.

Another aspect is a telecommunications panel system including a patching device and a telecommunications panel. The patching device includes a body, a first latching element, and a second latching element. The body has a first side and an opposite second side. The first latching element is arranged at the first side of the housing and includes a first slot. The second latching element is arranged at the second side of the body and includes a flexible latch. The flexible latch has a second slot and a gap. The telecommunications panel includes a receptacle module having a plurality of device receptacle openings each configured to at least partially receive the patching device. The receptacle module includes a first mounting flange, a second mounting flange, and a plurality of ramp elements. The first mounting flange is configured to engage the first slot of the first latching element of the patching device. The second mounting flange is configured to engage the second slot of the second latching element of the patching device. The plurality of ramp elements is associated with the plurality of device receptacle openings, respectively. Each of the plurality of ramp elements extends over the second mounting flange and is configured to contact a free end of the flexible latch and depress the flexible latch as the patching device is received in one of the plurality of device receptacle openings. Each of the plurality of ramp elements is received in the gap of the second latching element of the patching device when the patching device is secured to the receptacle module.

In certain examples, the telecommunications panel includes a panel frame including a receptacle module opening, and the receptacle module is at least partially received in the receptacle module opening.

In certain examples, the flexible latch of the patching device includes a first latch projection and a second latch projection. The second slot is defined between the first latch projection and the second latch projection.

In certain examples, the first latch projection has a sloped surface configured to contact with one of the plurality of ramp elements as the patching device is received in one of the plurality of device receptacle openings.

In certain examples, the flexible latch is depressed when the first latch projection engages with one of the plurality of ramp elements.

In certain examples, the flexible latch is at least partially flexed back when the second slot of the patching device engages with the second mounting flange of the receptacle module.

In certain examples, the gap is formed adjacent the second latch projection.

In certain examples, each of the plurality of ramp elements includes a sloped engaging face configured to contact the sloped surface of the first latch projection of the flexible latch as the patching device is inserted into the one of the plurality of device receptacle openings. In certain examples, the sloped engaging face is configured to provide a leverage point against which a removal tool engages to depress the flexible latch and enable the patching device to be removed from the one of the plurality of device receptacle openings.

In certain examples, the first mounting flange is arranged to be parallel with the second mounting flange.

In certain examples, the plurality of device receptacle openings is arranged in a row along a first direction, and wherein the first mounting flange and the second mounting flange extend in the first direction.

In certain examples, the patching device includes a modular jack.

Yet another aspect is a method for mounting a patching device to a telecommunications panel. The method includes engaging a first slot of the patching device with a first mounting flange of a receptacle module, the receptacle module having a plurality of device receptacle openings each configured to at least partially receive the patching device; pivoting the patching device toward one of the plurality of device receptacle openings around a pivot area where the first slot of the patching device engages with the first mounting flange of the receptacle module; engaging a flexible latch of the patching device with a ramp element of the receptacle module to enable the ramp element to depress the flexible latch as the patching device is pivoted around the pivot area; engaging a second slot of the patching device with a second mounting flange of the receptacle module, the second slot formed on the flexible latch; and engaging a gap of the patching device with the ramp element of the receptacle module, the gap formed on the flexible latch.

In certain examples, the method further includes engaging a first latch projection of the flexible latch with the ramp element of the receptacle module to enable the ramp element to depress the flexible latch as the patching device is pivoted around the pivot area. The second slot is defined by the first latch projection and a second latch projection of the flexible latch.

In certain examples, the flexible latch is at least partially flexed back when the second slot of the patching device engages with the second mounting flange of the receptacle module.

In certain examples, the ramp element includes a sloped engaging face configured to contact the flexible latch as the patching device is pivoted around the pivot area.

BRIEF DESCRIPTION OF THE DRAWINGS

FIG. 11 illustrates the patching device is in a third position relative to the receptacle module.

DETAILED DESCRIPTION

Figure 1:
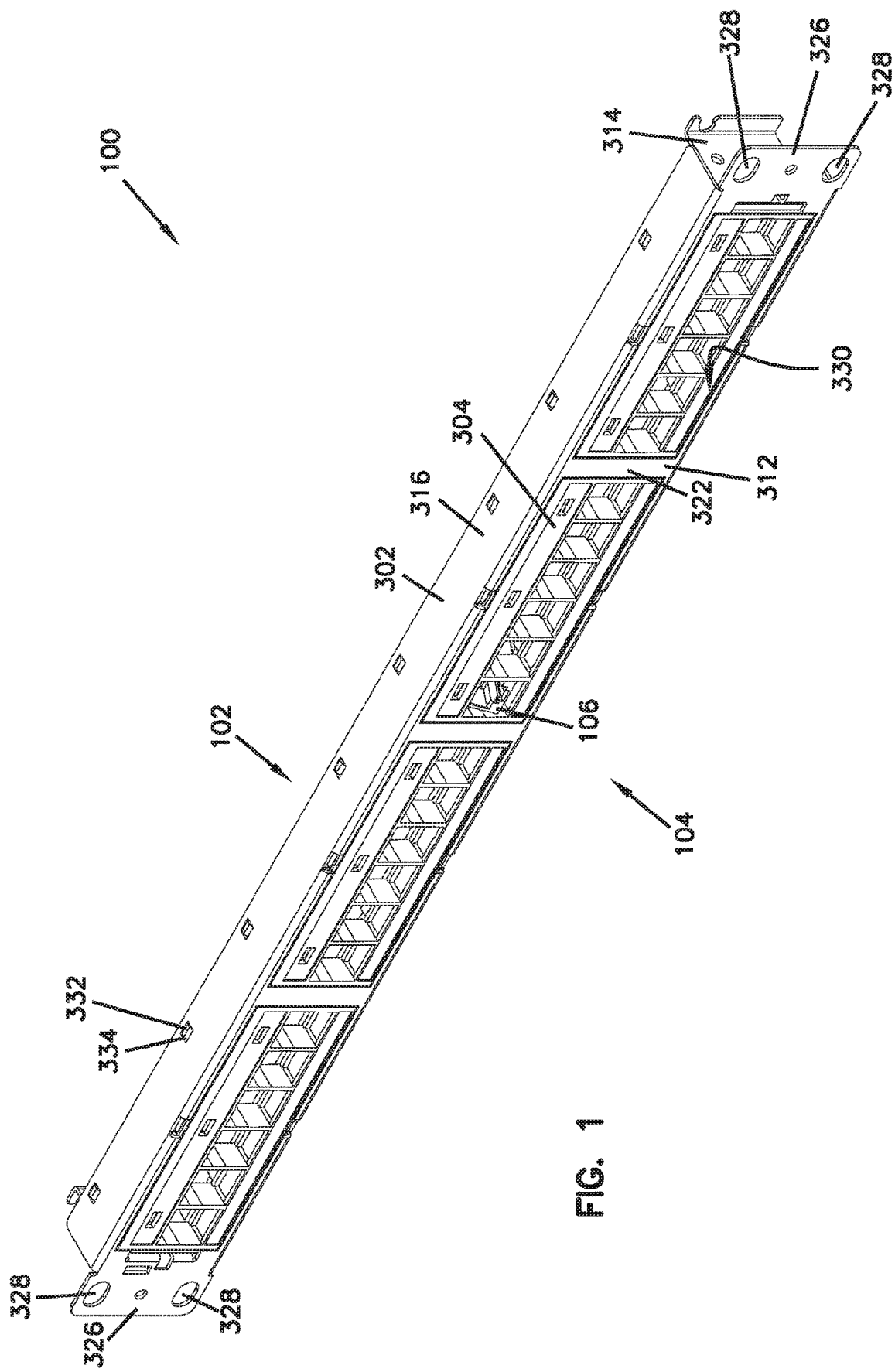
FIG. 1 is a front perspective view of an example telecommunications panel system.

Various embodiments will be described in detail with reference to the drawings, wherein like reference numerals represent like parts and assemblies throughout the several views.

Figure 2:
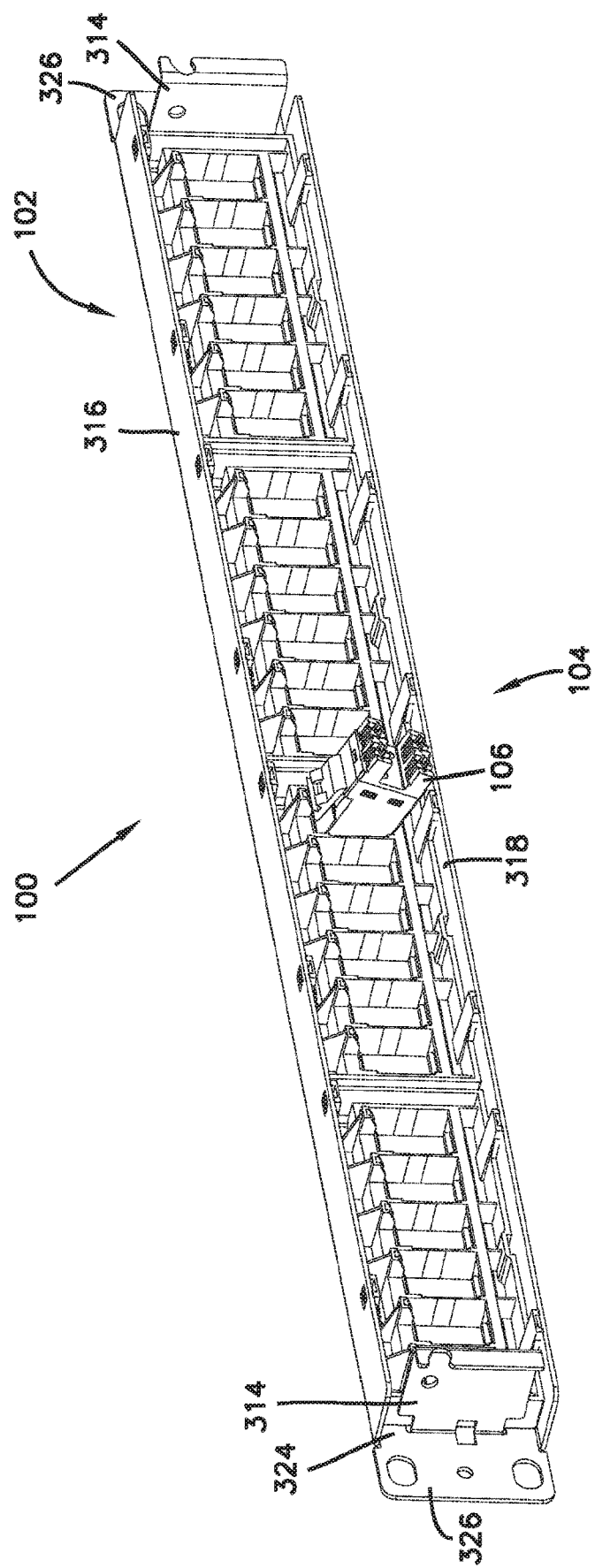
FIG. 2 is a rear perspective view of the telecommunications panel system of FIG. 1.

Referring to FIGS. 1 and 2, an example telecommunications panel system 100 in accordance with the present disclosure includes a telecommunications panel 102 and one or more patching devices 104. One example of the telecommunications panel 102 includes a patch panel as illustrated herein. In this document, therefore, the telecommunications panel is also referred to as the patch panel or the panel. The telecommunications panel 102 can be configured to mount to a network rack (also referred to herein as a communications rack, equipment rack, or the like) (not shown).

Figure 12:
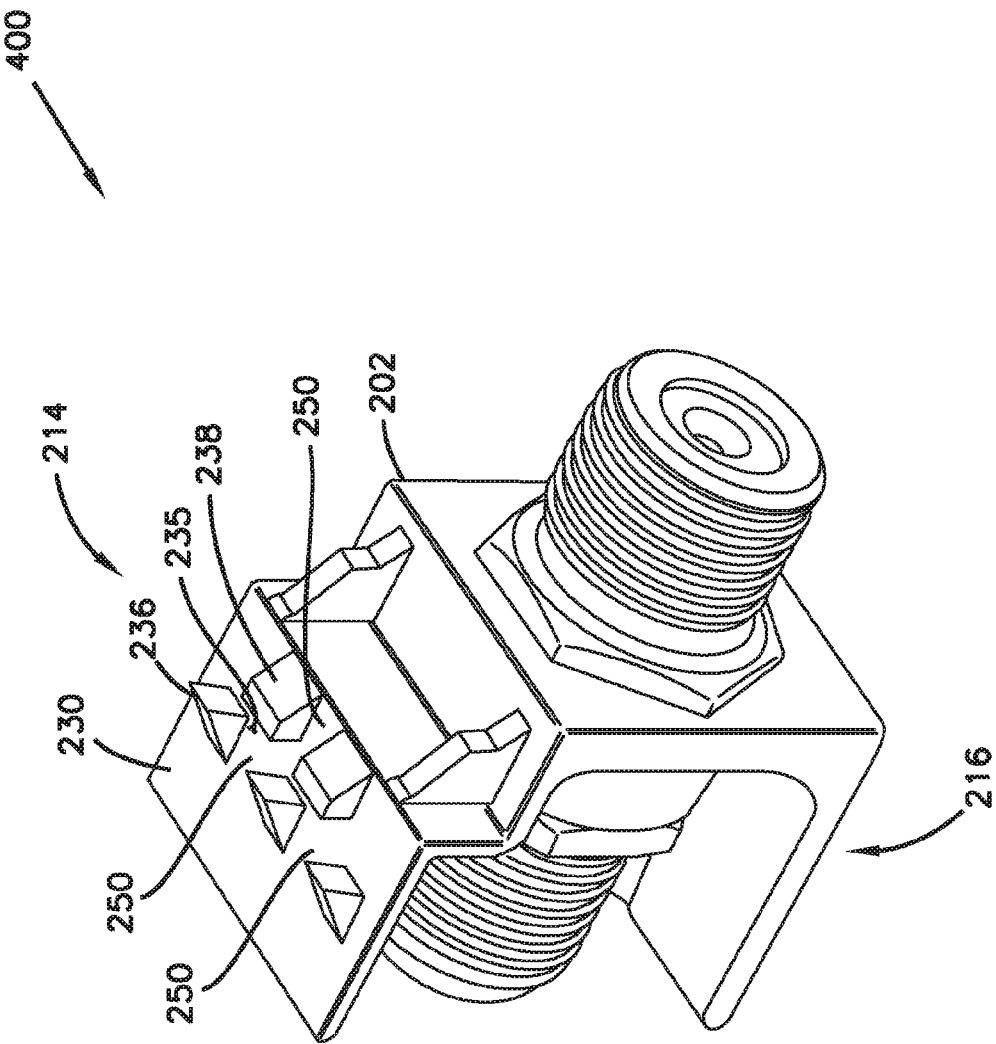
FIG. 12 is a perspective view of another example patching device.

The patching device 104 is configured to mount to the panel 102. Various types of the patching device 104 can be mounted to the panel 102. One example of the patching device 104 includes a modular jack 106 (also referred to herein as a jack module), as illustrated in FIGS. 1-4 and 9-11. Another example of the patching device 104 includes an electrical insert 400, as illustrated in FIG. 12. Other patching devices are also available and mountable to the panel 102. As illustrated herein, the patching device 104, such as the modular jack 106 and the insert 400, includes features for mounting the patching device 104 to the telecommunications panel 102. In FIGS. 1 and 2, a single modular jack 106 is shown as being inserted into the panel 102. It is understood that the panel 102 can be either partially or fully loaded with a plurality of patching devices 104 in the same or similar manner as the modular jack 106 shown in the illustrated example.

Figure 3:
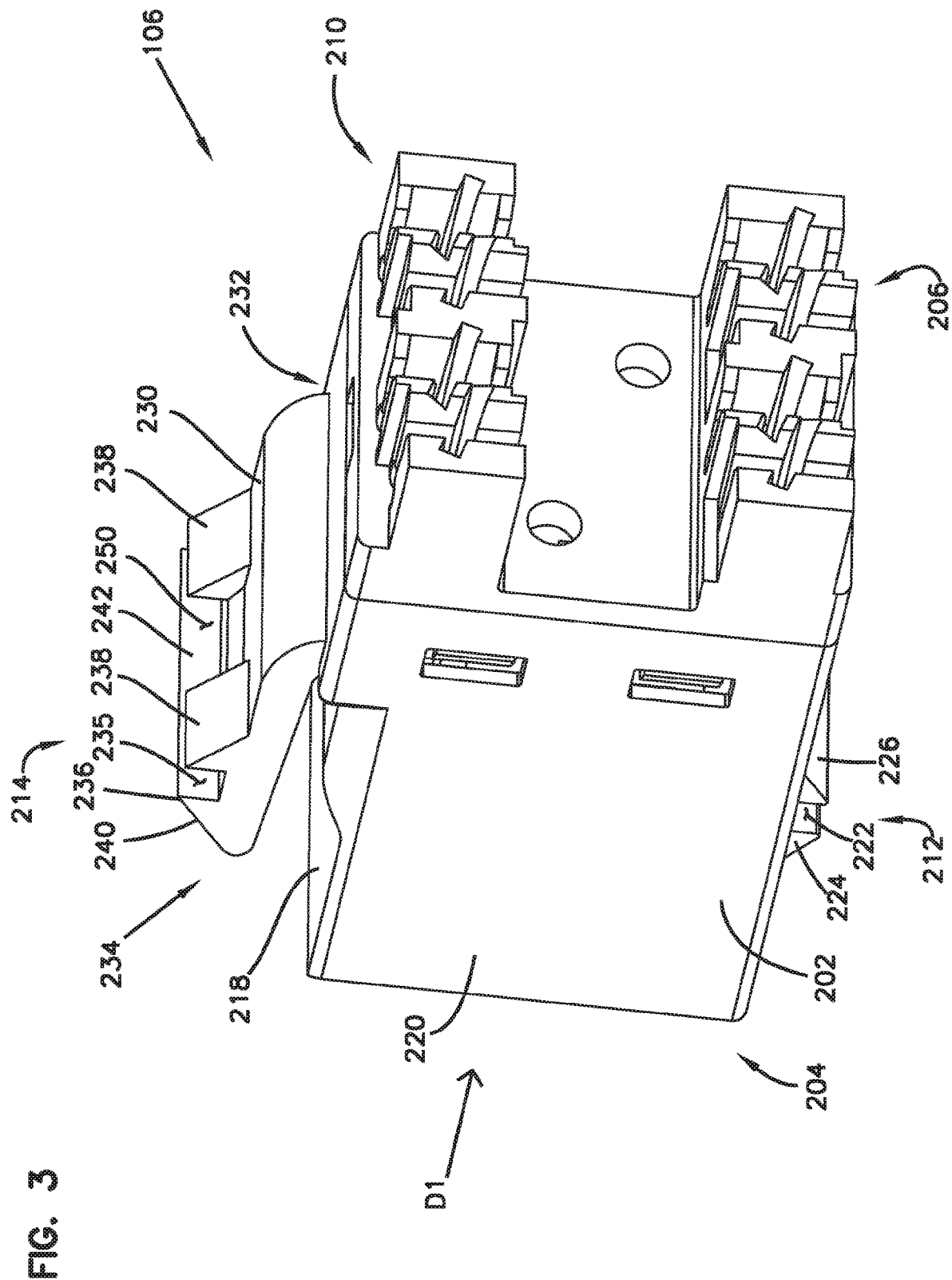
FIG. 3 is a perspective view of an example patching device.
Figure 4:
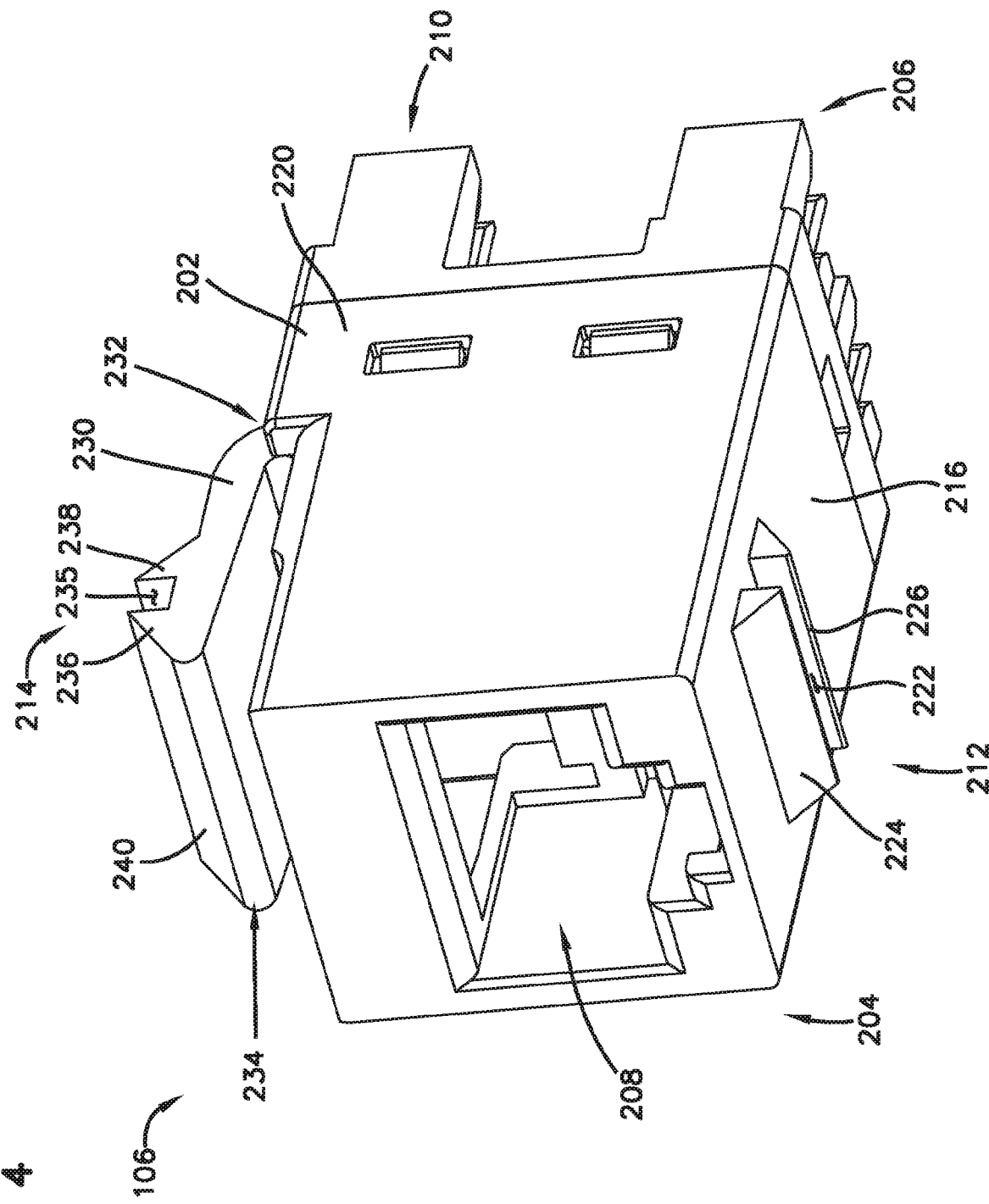
FIG. 4 is another perspective view of the patching device of FIG. 4.
Figure 5:
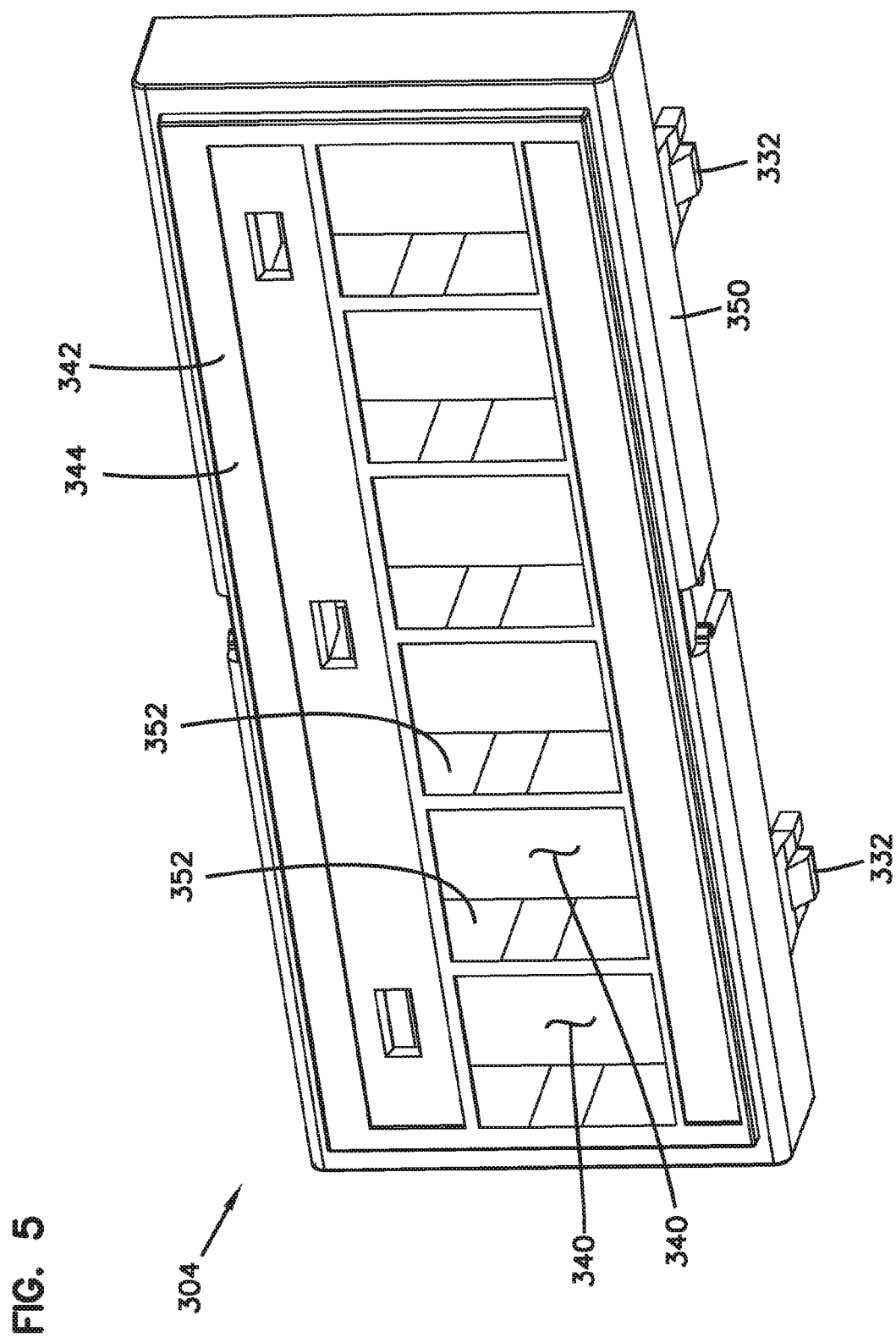
FIG. 5 is a front perspective view of an example receptacle module.
Figure 6:
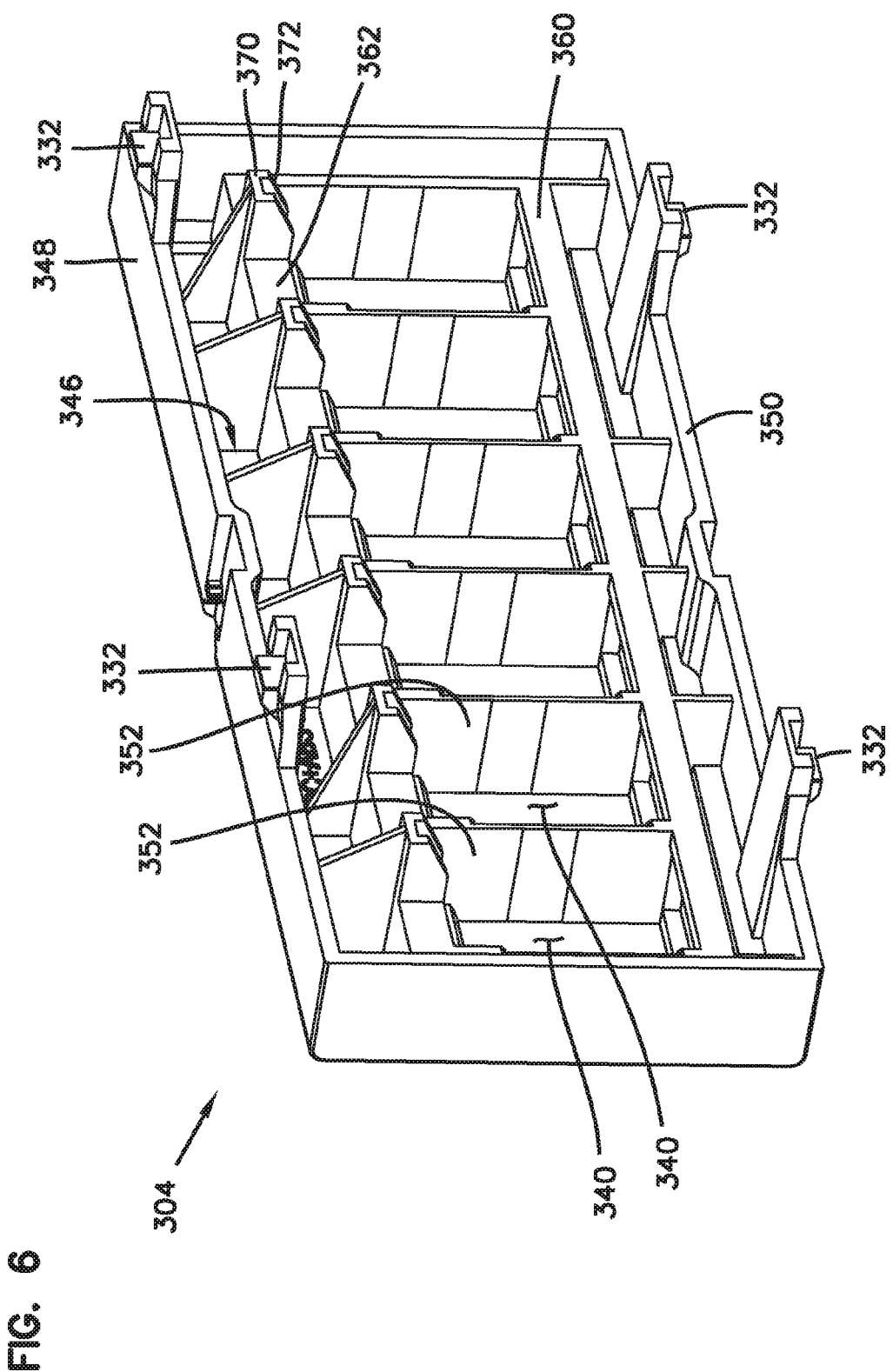
FIG. 6 is a rear perspective view of the receptacle module of FIG. 5.

Referring to FIGS. 3 and 4, an example of the modular jack 106 is configured to include one or more types of cable termination interfaces. In some embodiments, such cable termination interfaces are configured for electrical jacks. In other embodiments, the modular jack 106 is configured to include various types of optical adapters or other media interfaces. In the illustrated example, the modular jack 106 includes a main body 202 extending between a front end 204 and a rear end 206. The modular jack 106 further includes a jack receptacle 208 formed at the front end 204. In some examples, the jack receptacle 208 is configured as an RJ-type jack receptacle, so that a RJ-type plug (not shown) is inserted into the jack receptacle 208 in a jack insertion direction D1. The modular jack 106 can include a cable termination device 210 formed at the rear end 206 and configured to terminate and electrically connect a cable to the jack 106. In some embodiments, the cable termination device 210 includes an insulation displacement contact (IDC) assembly. Other types of cable termination devices are also possible.

The modular jack 106 includes latching features, such as a first latching element 212 and a second latching element 214, which are configured to facilitate mounting the modular jack 106 to the patch panel 102. In some examples, the latching features are provided on the main body 202 at a location between the front end 204 and the rear end 206. For example, the latching elements 212 and 214 can be located closer to the front end 204 than the rear end 206. Other locations are also possible for the latching element 212.

In the illustrated example, the first latching element 212 is provided on a first side 216 of the main body 202, and the second latching element 214 is provided on a second side 218 of the main body 202 opposite to the first side 216. The first side 216 and the second side 218 extend between the front end 204 and the rear end 206, and also extend between opposite sides 220.

The first latching element 212 includes a first slot 222. In some examples, the first slot 222 is defined between a pair of projections, such as a first projection 224 and a second projection 226, which project from the first side 216 of the main body 202. In the illustrated example, the first projection 224 and the second projection 226 extend in a direction (i.e., a transverse direction) transverse to the jack insertion direction D1, and are arranged to be parallel with each other so that the first slot 222 defines a channel extending in the transverse direction.

The second latching element 214 includes a flexible latch 230. The flexible latch 230 can be pivotally joined to the main body 202. In some examples, the flexible latch 230 is configured as a cantilevered latch, one end (e.g., a fixed end 232) of which is fixed at the second side 218 of the main body 202. The flexible latch 230 extends generally along the second side 218 of the main body 202 so that a free end 234 is arranged adjacent the front end 204 of the main body 202. The flexible latch 230 can be flexed relative to the main body 202 generally about the fixed end 232.

In some examples, the second latching element 214 includes a second slot 235, which can be arranged adjacent the free end 234 of the flexible latch 230. In some examples, the second slot 235 is defined between a pair of projections, such as a first latch projection 236 and a second latch projection 238. In the illustrated example, the first latch projection 236 is arranged at the free end 234 of the flexible latch 230, and the second latch projection 238 is arranged closer to the fixed end 232 of the flexible latch 230 than the first latch projection 236. The first latch projection 236 and the second latch projection 238 project from an exposed surface (i.e., an upper surface opposite to a lower surface facing the second side 218 of the main body 202) of the flexible latch 230. In the illustrated example, the first latch projection 236 and the second latch projection 238 extend in a direction (i.e., the transverse direction) transverse to the jack insertion direction D1, and are arranged to be parallel with each other so that the second slot 235 defines a channel extending in the transverse direction.

In some examples, the first latch projection 236 includes a sloped surface 240 towards the free end 234 of the flexible latch 230. The sloped surface 240 is formed at an angle relative to the second side 218 of the main body 202 and configured to facilitate deflection of the flexible latch 230 as the modular jack 106 is secured to the panel 102. The first latch projection 236 further has a stopper surface 242 opposite to the sloped surface 240 and adjacent the second slot 235. The stopper surface 242 is configured to inhibit removal of the modular jack 106 from the panel 102 once the modular jack 106 is secured to the panel 102, until the flexible latch 230 is deflected to release the jack 106 from the panel 102. Mounting and removal of the jack 106 relative to the panel 102 are further described herein.

The second latching element 214 can further include a gap 250. As described herein, the gap 250 is configured to at least partially receive a corresponding ramp element 370 of the telecommunications panel 102 when the modular jack 106 is mounted to the telecommunications panel 102. In some examples, the gap 250 is provided adjacent the second latch projection 238. For example, as illustrated, the gap 250 can be configured as a recess defined in the second latch projection 238. The gap 250 can be arranged in the middle of the second latch projection 238. Other configurations and arrangements of the gap 250 can also be possible in other examples. In yet other embodiments, a plurality of gaps 250 can be provided to at least partially receive one or more ramp elements 370 of a single patching device 104.

In some examples, the main body 202 is made of metallic material. In other examples, the main body 202 is made from a dielectric material (e.g., a plastic material). Such a dielectric material can be either shielded or unshielded. For example, the dielectric material can be shielded by a metallic material or a metalized plastic material, or by a metallic shield element.

Referring again to FIGS. 1 and 2, the telecommunications panel 102 is configured to interchangeably mount various types of patching devices 104, such as modular jacks 106, inserts 400 (FIG. 12), and other suitable devices. As described herein, the telecommunications panel 102 includes retaining features for easily and reliably securing the patching devices 104 thereto, and easily removing the patching devices 104 therefrom.

In some examples, the panel 102 includes a panel frame 302 and one or more receptacle modules 304 mounted to the panel frame 302.

The panel frame 302 is configured to receive a plurality of modular jacks 106. The panel frame 302 includes a front panel portion 312, opposite side panel portions 314, a top panel portion 316, and a bottom panel portion 318. In some examples, the front panel portion 312, the top panel portion 316, and the bottom panel portion 318 generally extend between the opposite side panel portions 314. The front panel portion 312 extends longitudinally between the side panel portions 314. In the illustrated examples, the front panel portion 312 extends linearly between the opposite side panel portions 314. In other examples, the front panel portion 312 can extend in different configurations, such as where the front panel portion 312 is bent at one or more locations, or where the front panel portion 312 is curved or angled.

The front panel portion 312 has a front face 322 and a rear face 324 opposite to the front face 322. The top panel portion 316 and the bottom panel portion 318 extend rearwards from the rear face 324 of the front panel portion 312 and are arranged to be parallel with each other. In some examples, the side panel portions 314 extend rearwards from the rear face 324 of the front panel portion 312.

The panel frame 302 can further include opposite lateral flanges 326 adjacent the opposite side panel portions 314. The lateral flanges 326 including mounting elements 328 configured to mount the patch panel 102 to an equipment rack, chassis, cabinet, or other structures. In some examples, the mounting elements 328 include holes through which fasteners (e.g., screws or bolts) pass to secure the patch panel 102 to the rack. In the illustrated example, the lateral flanges 326 extend laterally from the front panel portion 312.

The panel frame 302 can be made of various materials. In some examples, the panel frame 302 is made of metallic materials, such as steel or other metals, although other materials may be used alternatively or in addition.

The panel frame 302 can include one or more receptacle module openings 330 for receiving the receptacle modules 304. In some examples, the front panel portion 312 of the panel frame 302 includes a plurality of receptacle module openings 330 configured to at least partially receive the receptacle modules 304. The receptacle modules 304 can be at least partially inserted into the receptacle module openings 330 of the panel frame 302 and mounted to the panel frame 302. The receptacle modules 304 can be secured to the panel frame 302 in various manners. In some examples, the receptacle modules 304 are snap-fitted to the panel frame

302. For example, the receptacle module 304 includes one or more latching elements 332 (e.g., projections or tabs) configured to engage with corresponding latching elements 334 (e.g., holes or recesses) of the panel frame 302. In other examples, the receptacle modules 304 can be mounted to the panel frame 302 with fasteners.

As described, the receptacle module 304 can be at least partially received in the receptacle module opening 330 and secured to the panel frame 302. The receptacle module 304 can be arranged between the top panel portion 316 and the bottom panel portion 318 when secured to the panel frame 302.

Referring also to FIGS. 5-8, the receptacle module 304 includes a plurality of jack receptacle openings 340 configured to at least partially receive the modular jacks 106. The jack receptacle openings 340 can be configured to fit various types of modular jacks. By way of example, the jack receptacle openings 340 can be sized to receive any of the following types of modular jacks: AMP-TWIST 6S, 6AS, 7AS, SL, and AMP-TWIST 6AUTP.

In some examples, the receptacle module 304 includes a front part 342 having a front face 344 and a rear face 346. The receptacle module 304 further includes a top part 348 and a bottom part 350, which extend from the rear face 346 of the front part 342. In some examples, the top part 348 and the bottom part 350 are arranged to be generally parallel with each other. The top part 348 and the bottom part 350 of the receptacle module 304 are configured to arrange adjacent the top panel portion 316 and the bottom panel portion 318 of the panel frame 302, respectively, when the receptacle module 304 is secured to the panel frame 302, as illustrated in FIGS. 1 and 2. The receptacle module 304 further includes one or more partition walls 352 extending between the top part 348 and the bottom part 350 and defining the jack receptacle openings 340.

The receptacle module 304 includes a first device mounting element 360 and a second device mounting element 362, which are configured to secure the patching device 104, such as the modular jack 106, thereto.

The first device mounting element 360 is arranged adjacent the bottom part 350 of the receptacle module 304 and along a row of the jack receptacle openings 340. The first device mounting element 360 can include first mounting flanges 364, each of which can extend at least partially across a width of the associated jack receptacle opening 340. For example, the first mounting flanges 364 are associated with the jack receptacle openings 340, respectively, and project upwardly (in the view of FIGS. 5-8). In some examples, the first mounting flanges 364 are continuously formed along the row of the jack receptacle openings 340. As described herein, the first mounting flange 364 provides a portion with which the modular jack 106 engages. In some examples, as the modular jack 106 is secured to the receptacle module 304, the first latching element 212 of the jack 106 can seat on the first mounting flange 364. For example, the first mounting flange 364 of the receptacle module 304 is inserted into the first slot 222 of the modular jack 106 when the modular jack 106 is mounted to the receptacle module 304.

The second device mounting element 362 is arranged adjacent the top part 348 of the receptacle module 304 and along the row of the jack receptacle openings 340. The second device mounting element 362 can include second mounting flanges 366, each of which can extend at least partially across a width of the associated jack receptacle opening 340. For example, the second mounting flanges 366 are associated with the jack receptacle openings 340, respectively, and project downwardly (in the view of FIGS. 5-8). In some examples, the second mounting flanges 366 are continuously formed along the row of the jack receptacle openings 340. As described herein, the second mounting flange 366 provides a portion with which the modular jack 106 engages. In some examples, as the modular jack 106 is secured to the receptacle module 304, the second latching element 214 of the jack 106 can engage with the second mounting flange 366. For example, the second mounting flange 366 of the receptacle module 304 is inserted into the second slot 235 of the modular jack 106 when the modular jack 106 is mounted to the receptacle module 304. As described herein, as the modular jack 106 is inserted toward the jack receptacle openings 340 of the receptacle module 304, the flexible latch 230 is flexed until the second mounting flange 366 engages with the second slot 235 of the jack 106. The flexible latch 230 is at least partially flexed back so that the second mounting flange 366 remains inserted into the second slot 235 of the jack 106.

The first mounting flanges 364 and the second mounting flanges 366 are arranged to be aligned with the first slot 222 and the second slot 235, respectively, when the jack 106 is mounted to the panel 102 (e.g., the receptacle module 304 thereof). In some examples, the first slot 222 and the second slot 235 are arranged in the jack 106 to extend to be parallel with each other. Similarly, the first mounting flanges 364 and the second mounting flanges 366 are arranged to be parallel with each other.

The second device mounting element 362 further includes ramp elements 370. The ramp elements 370 are associated with the jack receptacle openings 340, respectively, so that each of the ramp elements 370 engages with a modular jack 106 mounted to one of the jack receptacle openings 340 which is arranged adjacent that ramp element 370. In the illustrated example, the ramp element 370 extends rearwards (in a direction away from the rear face 346 of the front part 342) over the second mounting flange 366.

In some examples, the ramp element 370 includes a sloped engaging face 372 configured to guide mounting and removal of the modular jack 106 to/from the receptacle module 304. The sloped engaging face 372 is configured to contact with the sloped surface 240 of the flexible latch 230 and press down the free end 234 of the flexible latch 230 as the modular jack 106 is mounted to the jack receptacle opening 340. The sloped surface 240 of the flexible latch 230 can slide against the sloped engaging face 372 of the ramp element 370 until the second mounting flange 366 is inserted into the second slot 235 of the flexible latch 230. When the second mounting flange 366 is inserted into the second slot 235 of the flexible latch 230, the ramp element 370 can be inserted into the gap 250 on the flexible latch 230. In this way, the modular jack 106 can be snapped in to the receptacle module 304.

The receptacle modules 304 can be made of various materials. In some examples, the receptacle modules 304 are made of dielectric materials, such as a plastic material.

In the illustrated example, the panel frame 302 has four receptacle module openings 330 for receiving four receptacle modules 304 in a single row, and each receptacle modules 304 is configured to mount six modular jacks 106 in a single row. In other examples, the panel frame 302 is configured to secure a greater or lesser number of receptacle modules 304 in one or more rows, and each receptacle module 304 is configured to secure a greater or lesser number of modular jacks 106 in one or more rows.

Although it is primarily described that the receptacle modules 304 are made separately from the panel frame 302 and mounted to the panel frame 302, it is understood that the receptacle modules 304 are integrally formed with the panel frame 302, in which case the panel frame 302 is considered to incorporate all the features of the receptacle modules 304 described herein, and a combination of the panel frame 302 and the receptacle modules 304 can be collectively referred to as a panel frame.

Figure 9:
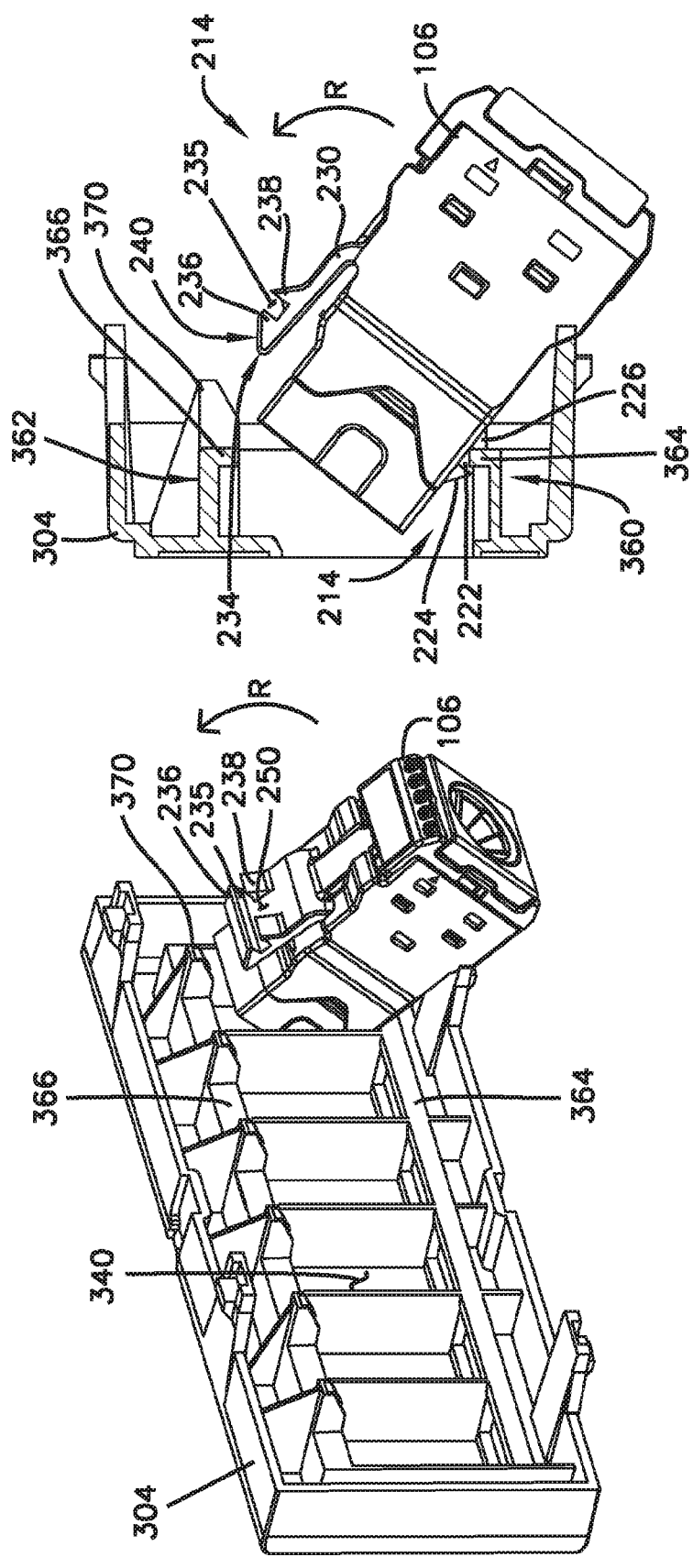
FIG. 9 illustrates a patching device in a first position relative to the receptacle module.
Figure 10:
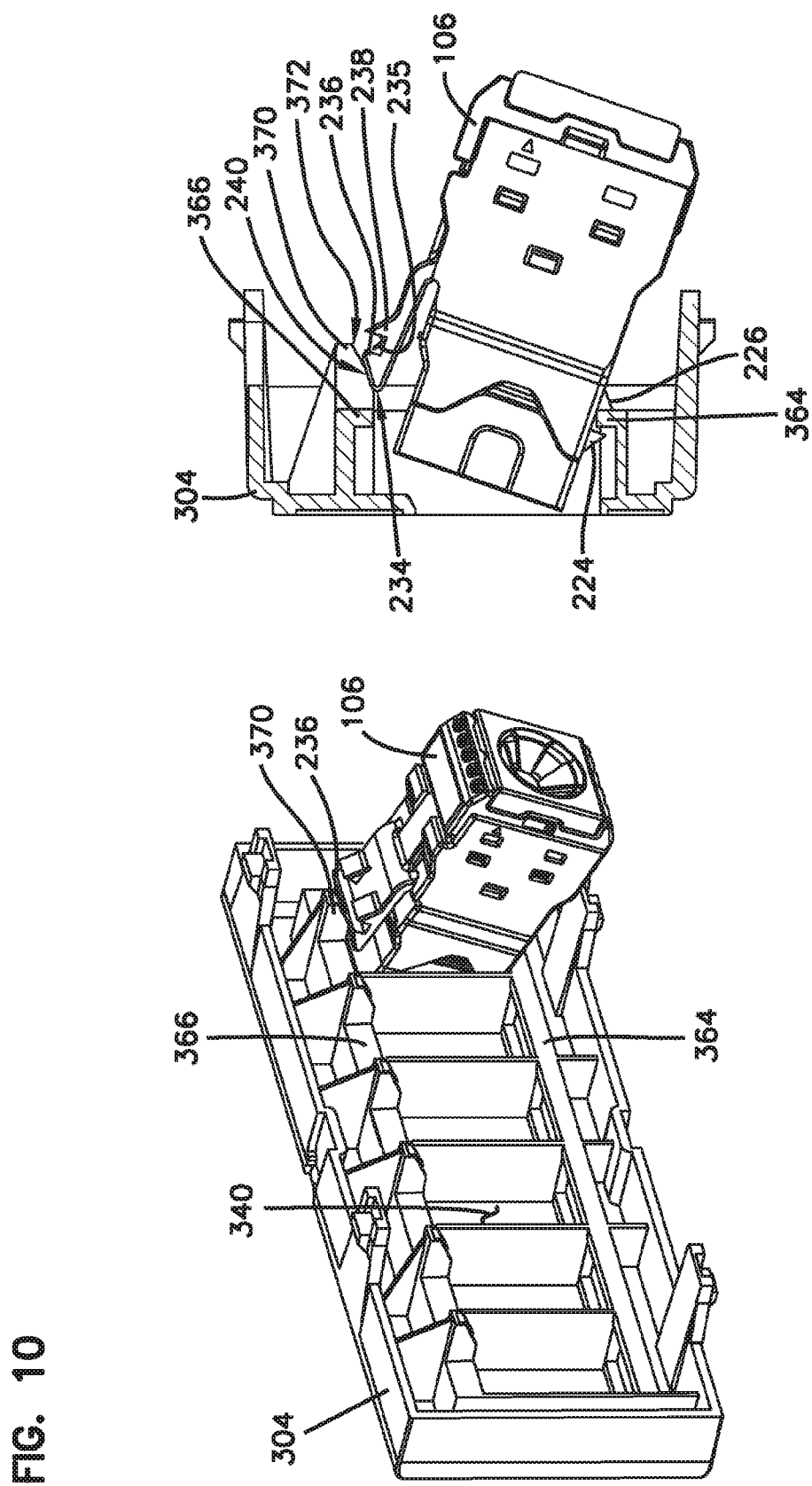
FIG. 10 illustrates the patching device is in a second position relative to the receptacle module.

Referring to FIGS. 9-11, an example method of mounting the modular jack 106 to the receptacle module 304. FIG. 9 illustrates that the modular jack 106 is in a first position relative to the receptacle module 304 where the modular jack 106 seats on the first device mounting element 360 of the receptacle module 304. FIG. 10 illustrates that the modular jack 106 is in a second position relative to the receptacle module 304 where the modular jack 106 is being mounted to the receptacle module 304 by contacting the flexible latch 230 of the modular jack 106 with the second device mounting element 362. FIG. 11 illustrates that the modular jack 106 is in a third position relative to the receptacle module 304 where the modular jack 106 is fully secured to the receptacle module 304.

Figure 7:
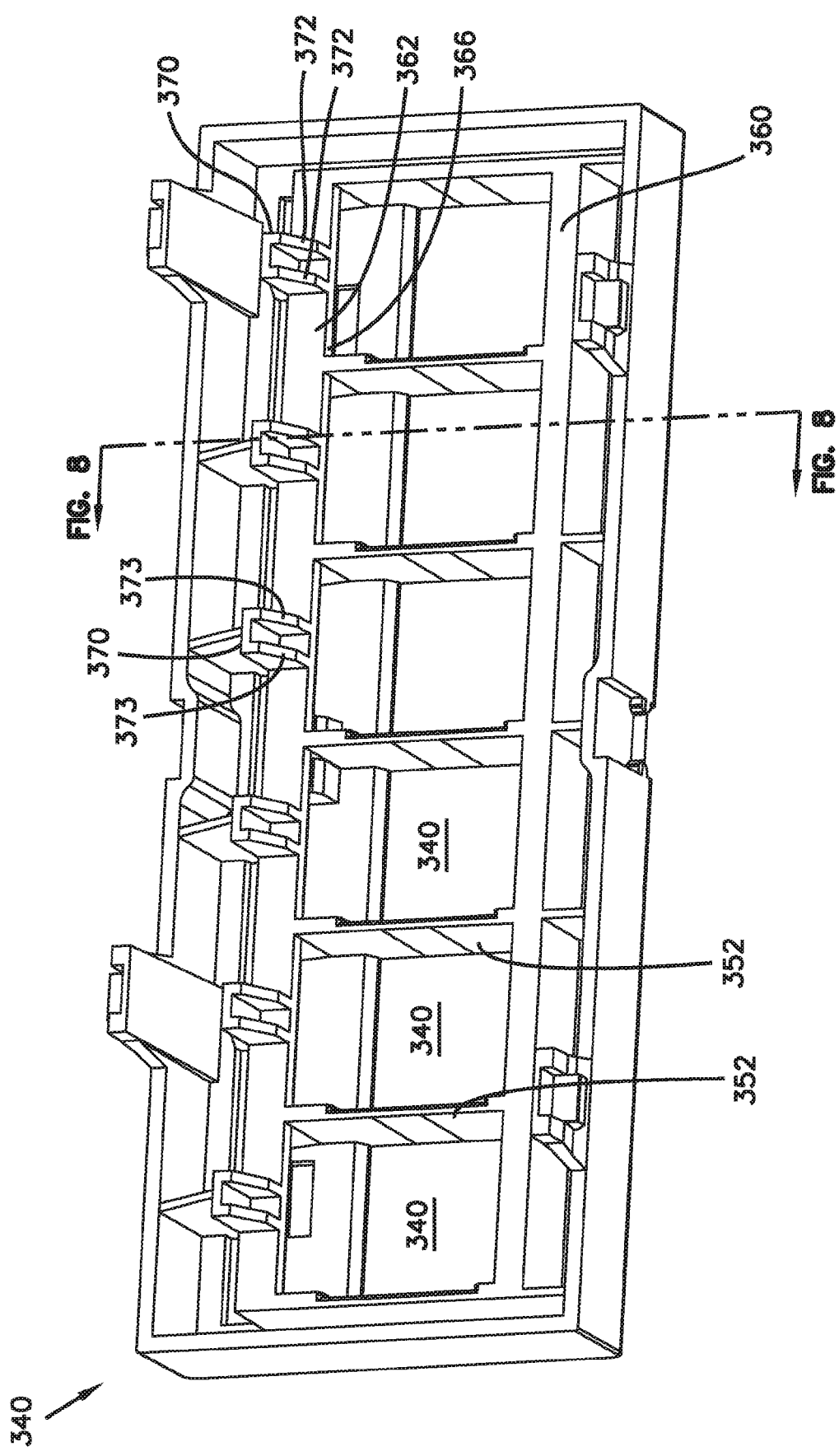
FIG. 7 is another rear perspective view of the receptacle module of FIG. 5.
Figure 8:
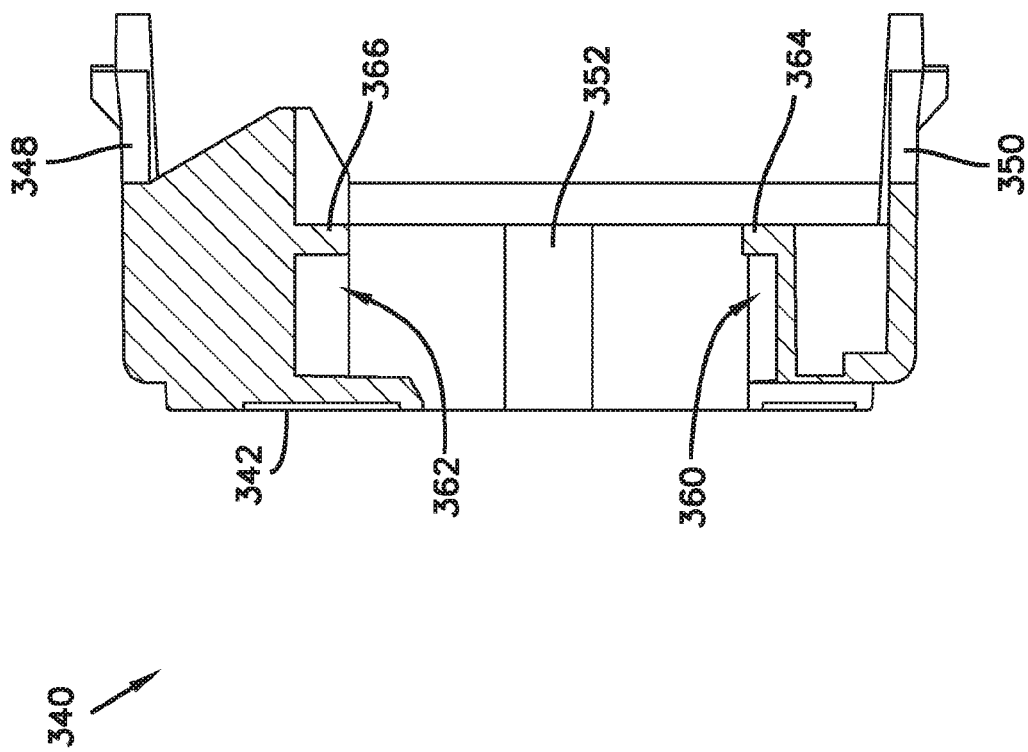
FIG. 8 is a cross sectional view of the receptacle module of FIG. 5.

As illustrated in FIG. 10, the modular jack 106 is first engaged with the first device mounting element 360 of the receptacle module 304. For example, the modular jack 106 is seated on the first device mounting element 360 by engaging the first slot 222 of the modular jack 106 with the first mounting flange 364 of the first device mounting element 360. Then, the modular jack 106 can be pivoted about a pivot area (or a contact point) 380 where the modular jack 106 engages with the first device mounting element 360 (e.g., the first mounting flange 364). In FIG. 7, the modular jack 106 is rotated about the pivot area 380 in a mounting direction R to be mounted to the receptacle module 304.

As illustrated in FIG. 11, as the modular jack 106 is further pivoted in the mounting direction R from the first position of FIG. 10, the free end 234 of the flexible latch 230 of the jack 106 becomes to contact with the ramp element 370 of the receptacle module 304. In some examples, the ramp element 370 contacts with the first latch projection 236 of the flexible latch 230 and presses down the flexible latch 230 at the free end 234 as the jack 106 is further rotated in the mounting direction R. In the illustrated example, as the jack 106 is pivoted about the pivot area 380 in the mounting direction R, the sloped surface 240 of the first latch projection 236 slides against the sloped engaging face 372 of the ramp element 370, and the flexible latch 230 is gradually flexed toward the second side 218 of the jack 106 until the second mounting flange 366 is inserted into the second slot 235 of the flexible latch 230, as illustrated in FIG. 12. As shown in FIG. 12, when the second mounting flange 366 is inserted into the second slot 235 of the flexible latch 230, the ramp element 370 is inserted into the gap 250 of the flexible latch 230.

Once the jack 106 is mounted to the receptacle module 304 as shown in FIG. 12, the first slot 222 and the second slot 235 inhibit separation of the jack 106 from the receptacle module 304. When it is desired to remove the jack 106 from the receptacle module 304, the flexible latch 230 is depressed to release engagement of the second slot 235 from the second mounting flange 366, after which the jack 106 can be withdrawn from the receptacle module 304 in an reverse order (in the opposition direction to the mounting direction R).

When removing the jack 106 from the receptacle module 304, the ramp element 370 can be used as a leverage point so that a tool can be used to depress the flexible latch 230 to allow disengagement of the second slot 235 from the second mounting flange 366. Such a tool can be of various types, such as a screw driver. For example, the sloped engaging face 372 of the ramp element 370 provides a leverage point against which the tool presses down the flexible latch 230.

FIG. 12 is a perspective view of another example patching device 104. In the illustrated example, the patching device 104 includes a multi-media insert 400, such as a speaker post insert. Similar to the modular jack 106, the insert 400 includes the latching features as described with respect to the modular jack 106. To a reasonable extent, the same or similar reference numbers are used to illustrate the latching features of the insert 400, and the description thereof is omitted for brevity purposes. In this example, the gap 250 can be defined between the second latch projections 238, similarly to the example of the modular jack 106 above. In addition or alternatively, other gaps, such as either or both of the gaps 250 defined between adjacent the first latch projections 236, can also be used for at least partially receiving one or more ramp elements 370 of a patching device 104. In the illustrated example of FIGS. 6 and 7, the center of the ramping feature 370 is cored out to have two ridges 373 to accommodate the latching features. For example, the ridges 373 are at least partially disposed in the gaps 250 between the first latch projections 236, respectively. As described herein, the sloped engaging faces 372 can be provided on the ridges 373, respectively.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A telecommunication panel for mounting a patching device, the telecommunication panel comprising:
   a panel frame having a plurality of device receptacle openings each configured to at least partially receive the patching device, the panel frame including:
      a first mounting flange configured to engage a first slot of the patching device, wherein the first slot is arranged at a first side of the patching device;
      a second mounting flange configured to engage a second slot of the patching device, wherein the second slot is arranged at a second side of the patching device, the second side opposite to the first side of the patching device; and
      a plurality of ramp elements associated with the plurality of device receptacle openings, respectively, each of the plurality of ramp elements extending over the second mounting flange and configured to contact a flexible latch of the patching device and depress the flexible latch as the patching device is received in one of the plurality of device receptacle openings, each of the plurality of ramp elements being received in a gap of the patching device when the patching device is secured to the panel frame.

2. The telecommunication panel according to claim 1, wherein each of the plurality of ramp elements includes a sloped engaging face configured to guide the flexible latch of the patching device.

3. The telecommunication panel according to claim 1, wherein the first mounting flange is arranged to be parallel with the second mounting flange.

4. The telecommunication panel according to claim 1, wherein the plurality of device receptacle openings is arranged in a row along a first direction, and wherein the first mounting flange and the second mounting flange extend in the first direction.

5. A telecommunications panel system comprising:
a patching device including:
a body having a first side and an opposite second side;
a first latching element arranged at the first side of the body and including a first slot; and
a second latching element arranged at the second side of the body and including a flexible latch, the flexible latch having a second slot and a gap; and
a telecommunications panel including:
a receptacle module having a plurality of device receptacle openings each configured to at least partially receive the patching device, the receptacle module including:
a first mounting flange configured to engage the first slot of the first latching element of the patching device;
a second mounting flange configured to engage the second slot of the second latching element of the patching device; and
a plurality of ramp elements associated with the plurality of device receptacle openings, respectively, each of the plurality of ramp elements extending over the second mounting flange and configured to contact a free end of the flexible latch and depress the flexible latch as the patching device is received in one of the plurality of device receptacle openings, each of the plurality of ramp elements being received in the gap of the second latching element of the patching device when the patching device is secured to the receptacle module.

6. The telecommunications panel system according to claim 5, wherein the telecommunications panel includes a panel frame including a receptacle module opening, and the receptacle module is at least partially received in the receptacle module opening.

7. The telecommunications panel system according to claim 5, wherein the flexible latch of the patching device includes a first latch projection and a second latch projection, the second slot being defined between the first latch projection and the second latch projection.

8. The telecommunications panel system according to claim 7, wherein the first latch projection has a sloped surface configured to contact with one of the plurality of ramp elements as the patching device is received in one of the plurality of device receptacle openings.

9. The telecommunications panel system according to claim 7, wherein the flexible latch is depressed when the first latch projection engages with one of the plurality of ramp elements.

10. The telecommunications panel system according to claim 9, wherein the flexible latch is at least partially flexed back when the second slot of the patching device engages with the second mounting flange of the receptacle module.

11. The telecommunications panel system according to claim 10, wherein the gap is formed adjacent the second latch projection.

12. The telecommunications panel system according to claim 10, wherein each of the plurality of ramp elements includes a sloped engaging face configured to contact the sloped surface of the first latch projection of the flexible latch as the patching device is inserted into the one of the plurality of device receptacle openings.

13. The telecommunications panel system according to claim 12, wherein each sloped engaging face is configured to provide a leverage point against which a removal tool engages to depress the flexible latch and enable the patching device to be removed from the one of the plurality of device receptacle openings.

14. The telecommunications panel system according to claim 5, wherein the first mounting flange is arranged to be parallel with the second mounting flange.

15. The telecommunications panel system according to claim 5, wherein the plurality of device receptacle openings is arranged in a row along a first direction, and wherein the first mounting flange and the second mounting flange extend in the first direction.

16. The telecommunications panel system according to claim 5, wherein the patching device includes a modular jack.

17. A method for mounting a patching device to a telecommunications panel, the method comprising:
engaging a first slot of the patching device with a first mounting flange of a receptacle module, the receptacle module having a plurality of device receptacle openings each configured to at least partially receive the patching device;
pivoting the patching device toward one of the plurality of device receptacle openings around a pivot area where the first slot of the patching device engages with the first mounting flange of the receptacle module;
engaging a flexible latch of the patching device with a ramp element of the receptacle module to enable the ramp element to depress the flexible latch as the patching device is pivoted around the pivot area;
engaging a second slot of the patching device with a second mounting flange of the receptacle module, the second slot formed on the flexible latch; and
engaging a gap of the patching device with the ramp element of the receptacle module, the gap formed on the flexible latch.

18. The method according to claim 17, further comprising:
engaging a first latch projection of the flexible latch with the ramp element of the receptacle module to enable the ramp element to depress the flexible latch as the patching device is pivoted around the pivot area,
wherein the second slot is defined by the first latch projection and a second latch projection of the flexible latch.

19. The method according to claim 17, wherein the flexible latch is at least partially flexed back when the second slot of the patching device engages with the second mounting flange of the receptacle module.

20. The method according to claim 17, wherein the ramp element includes a sloped engaging face configured to contact the flexible latch as the patching device is pivoted around the pivot area.

* * * * *

UNITED STATES PATENT AND TRADEMARK OFFICE
CERTIFICATE OF CORRECTION

PATENT NO. : 11,228,818 B2
APPLICATION NO. : 16/762806
DATED : January 18, 2022
INVENTOR(S) : Yi Teh Shih It is certified that error appears in the above-identified patent and that said Letters Patent is hereby corrected as shown below:

In the Claims

Column 11, Line 51, Claim 9: "claim 7, wherein" should read --claim 8, wherein--

Signed and Sealed this
Twenty-first Day of June, 2022

Katherine Kelly Vidal
*Director of the United States Patent and Trademark Office*